United States Patent [19]
Sattler et al.

[11] Patent Number: 5,704,325
[45] Date of Patent: Jan. 6, 1998

[54] STACKED SNAIL-TYPE MANIFOLD

[75] Inventors: Eric R. Sattler; Joel S. Myers, both of Southgate, Mich.

[73] Assignee: Basf Corporation, Mount Olive, N.J.

[21] Appl. No.: 773,700

[22] Filed: Dec. 27, 1996

Related U.S. Application Data

[63] Continuation-in-part of Ser. No. 672,830, Jun. 28, 1996, Pat. No. 5,655,492.

[51] Int. Cl.$^6$ ................................................ F02B 75/22
[52] U.S. Cl. .............................. 123/184.42; 123/184.61
[58] Field of Search ......................... 123/184.42, 184.34, 123/184.31, 184.61, 184.53, 184.21

[56] References Cited

U.S. PATENT DOCUMENTS

| | | | |
|---|---|---|---|
| 4,301,775 | 11/1981 | Smart et al. | 123/184.61 |
| 4,440,120 | 4/1984 | Butler | 123/184.34 |
| 4,501,235 | 2/1985 | Muller | 123/184.53 |
| 4,510,896 | 4/1985 | Rutschmann | 123/184.34 |
| 4,643,138 | 2/1987 | Ruf et al. | 123/184.34 |
| 4,664,075 | 5/1987 | Poulos | 123/184.42 |
| 4,669,428 | 6/1987 | Ichida et al. | 123/184.31 |
| 4,726,329 | 2/1988 | Atkin | 123/184.34 |
| 4,907,547 | 3/1990 | Daly | 123/184.53 |
| 4,919,086 | 4/1990 | Shillington | 123/184.42 |
| 5,003,932 | 4/1991 | Duncan | 123/184.34 |
| 5,003,933 | 4/1991 | Rush, II et al. | 123/184.42 |
| 5,005,532 | 4/1991 | Shillington | 123/184.42 |
| 5,016,578 | 5/1991 | Ogawa et al. | 123/184.34 |
| 5,074,257 | 12/1991 | Amano et al. | 123/184.42 |
| 5,127,371 | 7/1992 | Ogawa et al. | 123/184.34 |
| 5,261,375 | 11/1993 | Rush, II et al. | 123/470 |
| 5,273,010 | 12/1993 | Elder | 123/184.61 |
| 5,477,819 | 12/1995 | Kopec | 123/184.61 |
| 5,492,088 | 2/1996 | Ohrnberger | 123/184.34 |
| 5,505,170 | 4/1996 | Cutler | 123/184.34 |

FOREIGN PATENT DOCUMENTS

| | | | |
|---|---|---|---|
| 0065064 | 11/1982 | European Pat. Off. | 123/184.61 |
| 2214373 | 10/1973 | Germany | 123/184.61 |
| 2744039 | 4/1979 | Germany | 123/184.21 |
| 2132692 | 7/1984 | United Kingdom | 123/184.42 |

*Primary Examiner*—David A. Okonsky
*Attorney, Agent, or Firm*—Mary E. Golota

[57] ABSTRACT

A stacked snail-type manifold design is provided including a plurality of plastic manifold sections which are engageable with one another. The stacked design provides a simple process for manufacturing a snail-type manifold. The use of plastic manifold sections reduces the weight of the manifold. Furthermore, the plastic manifold sections can be fabricated by an inexpensive and relatively simple molding process.

21 Claims, 9 Drawing Sheets

STACKED SNAIL-TYPE MANIFOLD

CROSS REFERENCES TO RELATED APPLICATIONS

This application is a continuation-in-part of U.S. application Ser. No. 08/672,830, filed Jun. 28, 1996 and now U.S. Pat. No. 5,655,492.

BACKGROUND OF THE INVENTION

FIELD OF THE INVENTION

The invention relates to a tuned air intake manifold for use with an internal combustion engine, and more particularly, to a labyrinth-type manifold which incorporates the functions of a plenum, attachment flange, and runners into a molded plastic box with inner walls for defining serpentine or curved shaped runners within the box. The use of plastic materials such as nylon reduces the weight of the manifold and decreases the cost.

A further embodiment of the present invention relates to a tuned air intake manifold for use with an internal combustion engine, and more particularly, to a stacked snail-type manifold which incorporates the functions of a plenum, attachment flange, and runners into a stacked plastic box with inner walls for defining spiral-shaped runners within the box.

BACKGROUND AND SUMMARY OF THE INVENTION

The air intake manifold of a multi-cylinder engine is a branched pipe arrangement which connects the valve ports of each cylinder with the air inlet. In a carbureted engine, it would be connected between the valve ports and the carburetor which would be downstream of the air inlet. The manifold can have considerable effect on engine performance. The intermittent or pulsating nature of the airflow through the manifold into each cylinder may develop resonances (similar to the vibrations in organ pipes) in the air flow at certain speeds. These may increase the volumetric efficiency and thus the power at certain engine speeds, but may reduce such efficiency at other speeds, depending on manifold dimensions and shape. Therefore, each manifold passageway is ideally tuned to a length calculated to maximize or minimize a chosen criteria, such as sound or efficiency.

Conventional manifolds can usually be broken into three distinct parts, the plenum, the runners (fluid conduits or pipes), and an attachment portion having an engine-attaching surface. Manifolds are typically made from steel aluminum or plastic. Making manifolds from plastic materials reduces the weight of the manifold. The assembly of the lighter plastic manifold is also less complex and more ergonomical than steel or aluminum manifolds. The use of plastics provides the ability to add intricate features to the manifold. Furthermore, plastic manifolds can be produced with reduced costs.

For conventional plastic manifolds, there are two processes currently accepted as production methods, the fusible core process and the multi-shell, welded process. The fusible core process is capital intensive, and difficult to keep in operation. The multi-shell welded manifold process produces relatively large parts which can waste significant underhood room. With ever-decreasing available underhood packaging room, the problem of fitting a manifold to an engine becomes a greater challenge.

Accordingly, it is desirable in the art of engine manifolds to provide a tuned plastic manifold which is lightweight, has smaller packaging requirements, and which is easy to manufacture.

A first embodiment of the present invention incorporates the function of a plenum, attachment flange, and tuned runners into a simply molded box with interior walls in order to save significant cost and underhood room.

The present invention provides an air intake manifold for use with an internal combustion engine having a labyrinth runner configuration in order to reduce the amount of space consumed by the manifold. The manifold is preferably made from a plastic material for reducing the weight of the manifold and for providing fabrication by an inexpensive and relatively simple molding process.

According to a second embodiment, the present invention incorporates the function of a plenum, attachment flange, and tuned runners into a simply stacked box made from manifold segments with interior walls in order to save significant cost and underhood room.

The present invention also provides a manifold system which is easier to manufacture than many currently used manifolds.

The present invention further provides a manifold assembly which is simple in structure, easy to mass produce, durable in use, and refined in appearance.

The present invention provides an air intake manifold for use with an internal combustion engine having a plurality of independent manifold sections including a base portion having a wall structure extending therefrom. The manifold sections are attached to one another in a stacked relationship such that the wall structure of the manifold sections meet, in a stacked relationship, with a base portion of an adjacent manifold section to define a plurality of manifold runners. The manifold is preferably made from a plastic material for reducing the weight of the manifold and for providing fabrication by an inexpensive and relatively simple molding process.

Currently, snail-type shell manifolds are produced using the lost or fusible core process. This process is both capital intensive and technically challenging. The new design of the present invention will permit the manufacture of a nearly-identically shaped manifold using significantly cheaper and easier technology.

Instead of producing the snail-type manifold shape by the lost core method, a series of individual runners and walls are molded and assembled together in a stacked relationship. Due to the inherent symmetry of manifolds, alternating runners are mirror images of each other. Odd numbered runners end up on one cylinder head while even numbered runners end up on the other. The base portion of each manifold section are provided with grooves into which the wall structure of the next runner is assembled. A sealant may be provided in the groove to provide an effective seal. According to a preferred embodiment, all the manifold sections are stacked together and held in place by long bolts which pin the corners together.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description. For example, while the manifold of the present invention is extremely useful for use as an intake manifold for an internal combustion engine, it may find utility as a manifold for use with compressors, pumps, and other apparatus.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
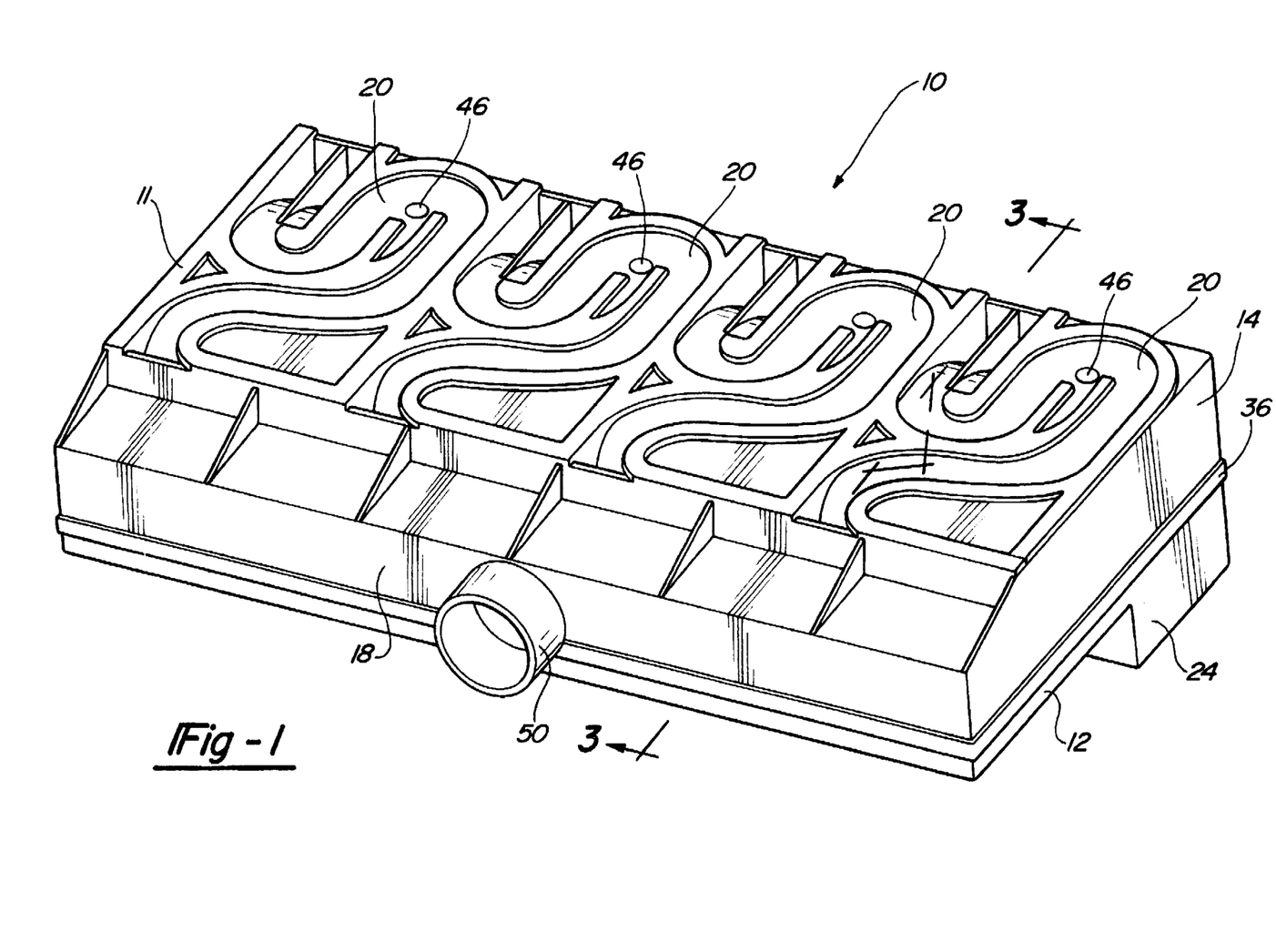
FIG. 1 is a perspective view of a labyrinth manifold according to the principles of the present invention.
Figure 2:
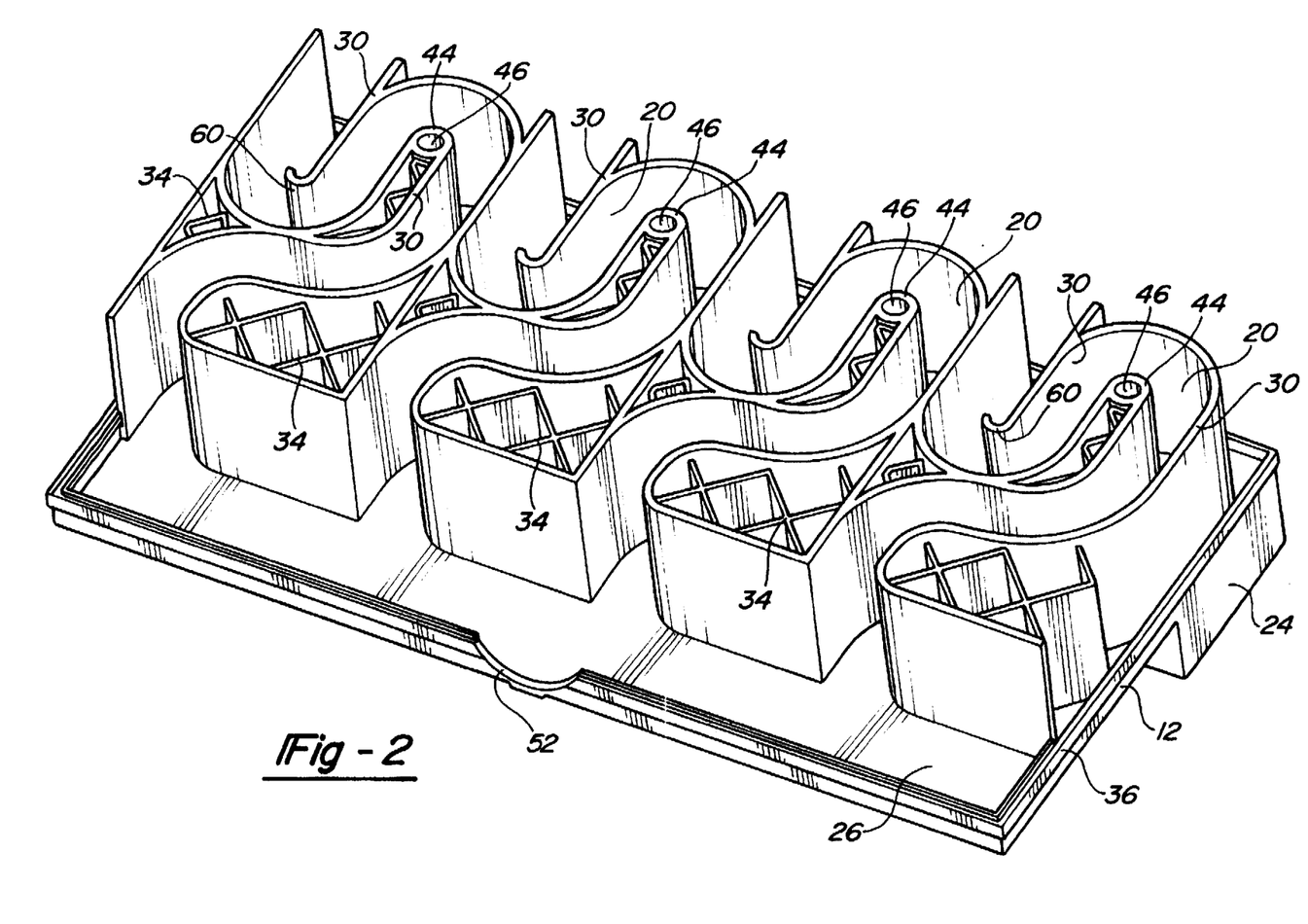
FIG. 2 is a perspective view of the labyrinth box member of the labyrinth manifold showing the inner walls defining the runners.
Figure 3:
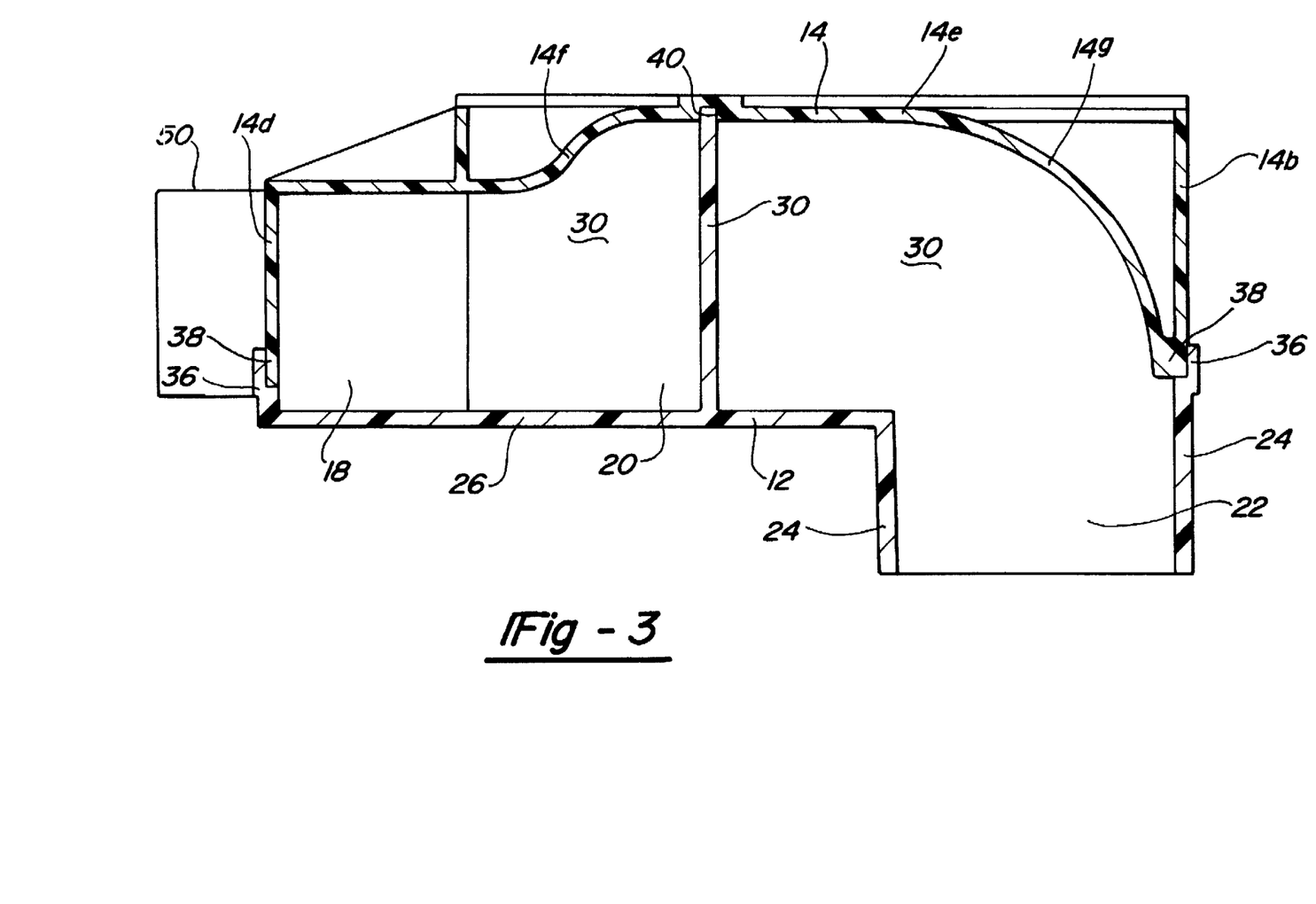
FIG. 3 is a transverse sectional view taken along line 3—3 in FIG. 1.
Figure 4:
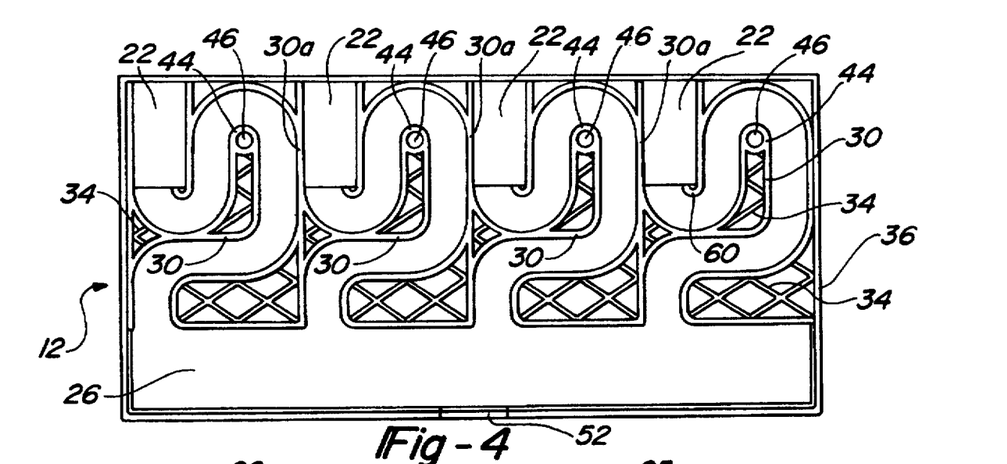
FIG. 4 is a plan view of the labyrinth box member showing the inner walls forming the runners.
Figure 5:
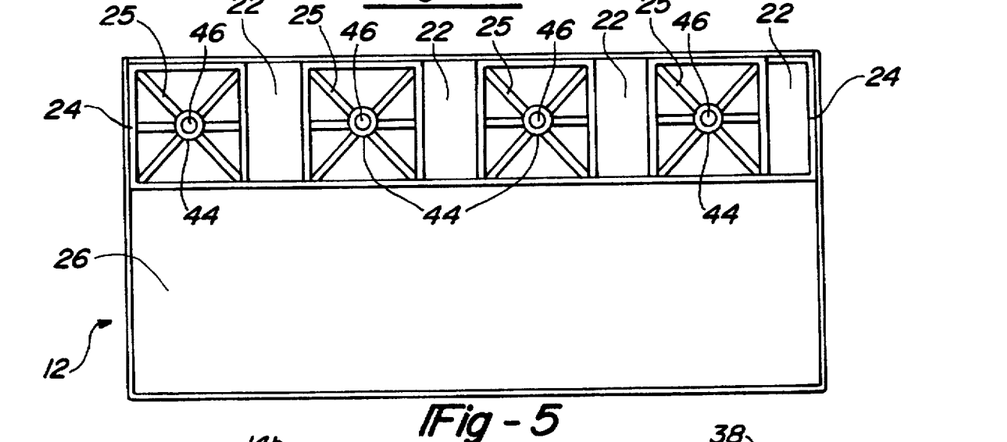
FIG. 5 is a plan view of the engine attaching surface of the labyrinth box member of the labyrinth manifold.

With reference to FIGS. 1–6, a first embodiment of the present invention will be described. As shown, labyrinth manifold 10 includes a housing 11 including a first housing member and a second housing member. The first and second housing members include a molded labyrinth box member 12 and a cover member 14 assembled on labyrinth box member 12. Labyrinth box member 12 and cover member 14 combine to define a plenum chamber 18 and a plurality of runners 20. Runners 20 communicate between plenum chamber 18 and outlet ports 22 communicating with an engine attachment flange 24, as best shown in FIGS. 4 and 5. Engine attachment flange 24 is shown disposed on a back side of box member 12, however, if desired, it may be disposed at other locations such as on the outer surface of cover member 14, for example. As shown in FIG. 5, engine attachment flange 24 is preferably provided with a plurality of reinforcing ribs 25.

Labyrinth box member 12 is provided with a generally planar base portion 26. A plurality of integral inner walls 30 extend from a base portion 26 for defining the side walls of runners 20. Inner walls 30 are generally perpendicular to base portion 26. However, it should be understood that inner walls 30 may also be angled with respect to the base portion 26. As best seen in FIG. 4, inner walls 30 are provided with common wall portions 30a which are disposed between two adjacent runners 20. The interface between inner walls 30 and base portion 26 can also be reduced in order to reduce turbulence in the air flow through runners 20.

Runners 20 are generally labyrinth shaped. By "labyrinth shaped", it is meant that the runners 20 are substantially serpentine or otherwise curved in shape in plan. The length of the runners 20 is tuned to the engine's power and fuel efficiency as is known in the art with regard to conventional manifolds. Thus, if long runners are required in order to obtain a desired engine power or fuel efficiency, each runner can be folded into a serpentine shape in order to provide a desired runner length between its plenum outlet portion 20a and its outlet port 22 so as to occupy a compact space. Shorter runners will require less curvature. Inner walls 30 may also be provided with reinforcement ribs 34 for providing strength. A flange 36 is provided around an outer periphery of base portion 26 to facilitate attachment of labyrinth box member 12 to cover member 14.

Cover member 14 is generally provided with a plurality of sidewalls 14a–14d and a top wall 14e. Sidewalls 14a–14d are each provided with a peripheral flange 38 which engages flange 36 of labyrinth box member 12. Flange 36 is designed to overlap with flange 38, as shown in FIG. 3, in order to provide a sealing relationship between box member 12 and cover member 14. Top wall 14e is provided with an upwardly curved portion 14f adjacent to plenum chamber 18 for allowing a smooth air flow from plenum chamber 18 into runners 20. Top wall 14e is also provided with a downwardly curved portion 14g above outlet ports 22 of labyrinth box member 12.

Figure 6:
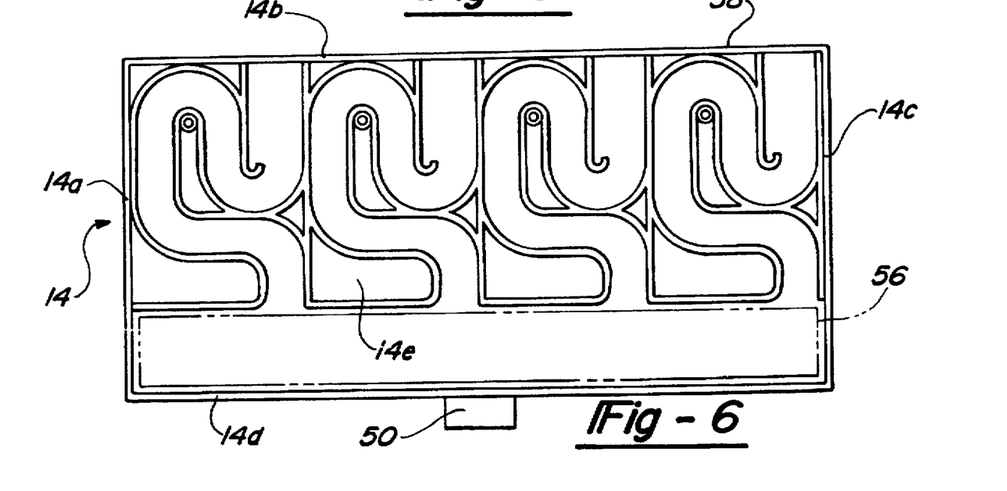
FIG. 6 is a plan view of the bottom of the cover member of the labyrinth manifold.

As best shown in FIG. 6, the top wall 14e of cover member 14 is provided with a plurality of grooves 40 which correspond to the configuration of inner walls 30 of box member 12. Grooves 40 are designed to engage with the upper edges of inner walls 30, as shown in FIG. 3. An adhesive seal bead is preferably provided between the grooves 40 and inner walls 30 to ensure air tightness between each of the runners 20 such that no "cross-talk" between runners occurs. In addition, an adhesive seal bead is provided between flange 36 and flange 38 in order to secure cover member 14 to labyrinth box member 12. Cover member 14 may also be fastened to box member 12 by bolts, screws, or other known fastening methods (not shown).

Labyrinth box member 12 and cover member 14 are preferably made from an engineering plastic material having suitable performance properties such as desirable heat stability and dimensional stability and utilizing a conventional injection molding technique. Illustrative materials are nylon (polyamide), ABS polymer (acrylonitrile-butadiene-styrene), and polycarbonate. Such materials may also be reinforced with glass and/or mineral fibers or particles. Especially preferred materials are ULTRAMID® A3HG7

Blk Q17 20560 nylon, ULTRAMID®A3WG7 Blk 23210 nylon, and ULTRAMID® B3WG7 Blk 564 BGVW nylon, commercially from BASF Corporation of Wyandotte, Mich. The use of such materials provides a weight reduction in comparison with steel and aluminum manifolds which are currently in use. However, the labyrinth manifold 10 may also be made from steel, aluminum, or other suitable materials without sacrificing the smaller packaging obtained by the design of the present invention. When a glass-reinforced nylon or other engineering plastic material is used, the box member 12 and cover member 14 can be formed by known injection molding processes.

The adhesive sealant which is used for securing cover member 14 to box member 12 can be any known suitable adhesive sealant, such as room temperature vulcanizing (RTV) silicone sealant.

Box member 12 and cover member 14 are each provided with bosses 44 around bolt holes 46. The bosses 44 on the box member 12 align with bosses 44 on cover member 14. A plurality of bolts (not shown) are inserted through bolt holes 46 of box member 12 and cover member 14 in order to secure engine attachment flange 24 of labyrinth manifold 10 to the engine (not shown), with outlet ports 22 in alignment with the intake valve ports of the engine (a four cylinder engine in the embodiment shown).

Cover member 14 is provided with an integral tubular flange 50 which is connected to the carburetor or throttle body of the air intake system, not shown. Tubular flange 50 is received in a cut out portion 52 of labyrinth box member 12. Alternatively, the tubular flange 50 can be molded with labyrinth box member 12 or may be partially molded in both the box member 12 and cover member 14, as will be clear to the skilled artisan in light of the instant teachings.

Labyrinth manifold 10 can be provided with internal valving or baffles as desired, as utilized in conventional manifolds, for partitioning the runners to increase or decrease the runner volume under certain circumstances. In particular, depending upon the engine RPM, different runner lengths are needed for optimal engine performance. Thus, valving is used in order to attempt to optimize the engine performance at more than one engine speed. Runners 20 can also be originally formed with different lengths for each outlet port, if desired.

The labyrinth manifold 10 may optionally be designed to receive a filter 56 in plenum chamber 18, as shown in phantom lines in FIG. 6. Additionally, it is possible to provide labyrinth manifold 10 with a noise shield. A noise shield would be obtained by providing hollow sections in the outer surfaces of labyrinth box member 12 or cover member 14. The hollow sections could then be filled with foam or other noise absorbing materials. The internal valving, air filter, and other noise absorbing materials can be inserted into the manifold 10 before final assembly.

Furthermore, if additional runner length is required for optimal engine performance, it is also possible to stack another labyrinth box on top of labyrinth box member 12 in order to increase the length of the runners 20. In this case, the inner walls would define runners which communicate between the stacked labyrinth box members so that the runner length can be increased, as will be clear to the skilled artisan in light of the instant teachings.

The shape of runners 20 is such as to ensure adequate airflow around the corners of the runners without significant pressure loss. Flow losses can be further reduced by increasing the height of the runners 20 either locally or throughout their full length to increase the cross section thereof. Downstream edges can also be folded back, as at 60, to enhance efficient air flow.

Figure 7:
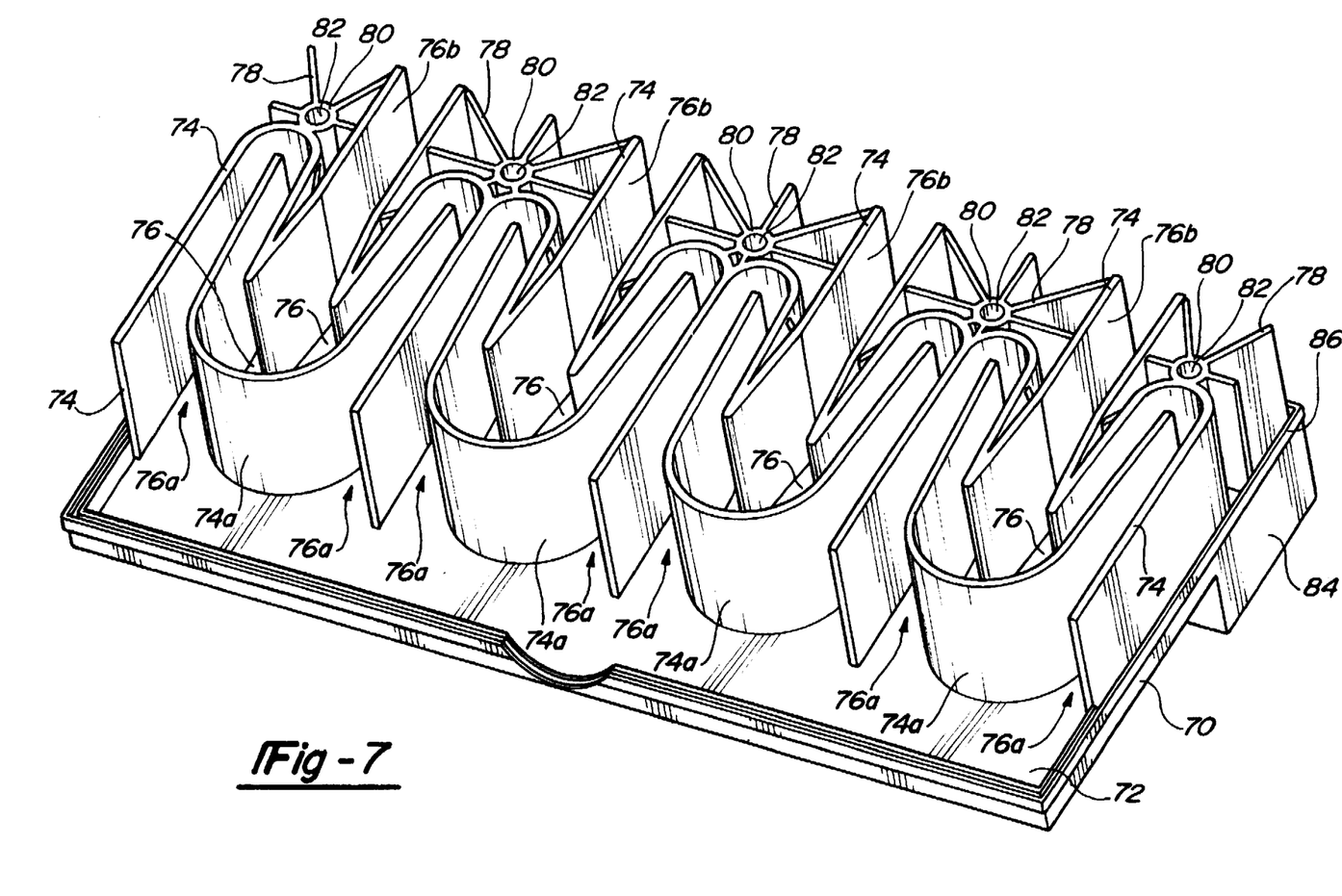
FIG. 7 is a perspective view of a second embodiment of the labyrinth box member according to the principles of the present invention.

FIG. 7 illustrates a labyrinth box member 70 according to an alternative embodiment of the present invention. Labyrinth box member 70 is provided with a base portion 72 having inner walls 74 extending therefrom for defining a plurality of runners 76. Runners 76 include a pair of split inlet runner portions 76a and a common outlet runner portion 76b. Split runner portions 76a are defined by U-shaped inner walls 74a. Thus, a pair of split runners 76a communicate with the common runner portion 76b which has an outlet (not shown) disposed at an end thereof. Reinforcing members 78 are provided for supporting inner walls 74, and boss members 80 are provided with mounting bolt holes 82 therethrough. Attachment flange 84 is provided for attaching the labyrinth manifold to the intake ports of an engine. Under this embodiment a cover member (not shown) would be provided with outside walls and grooves for engaging the top edges of the inner walls and bosses in a similar manner as discussed above with respect to FIGS. 1–6.

Figure 8:
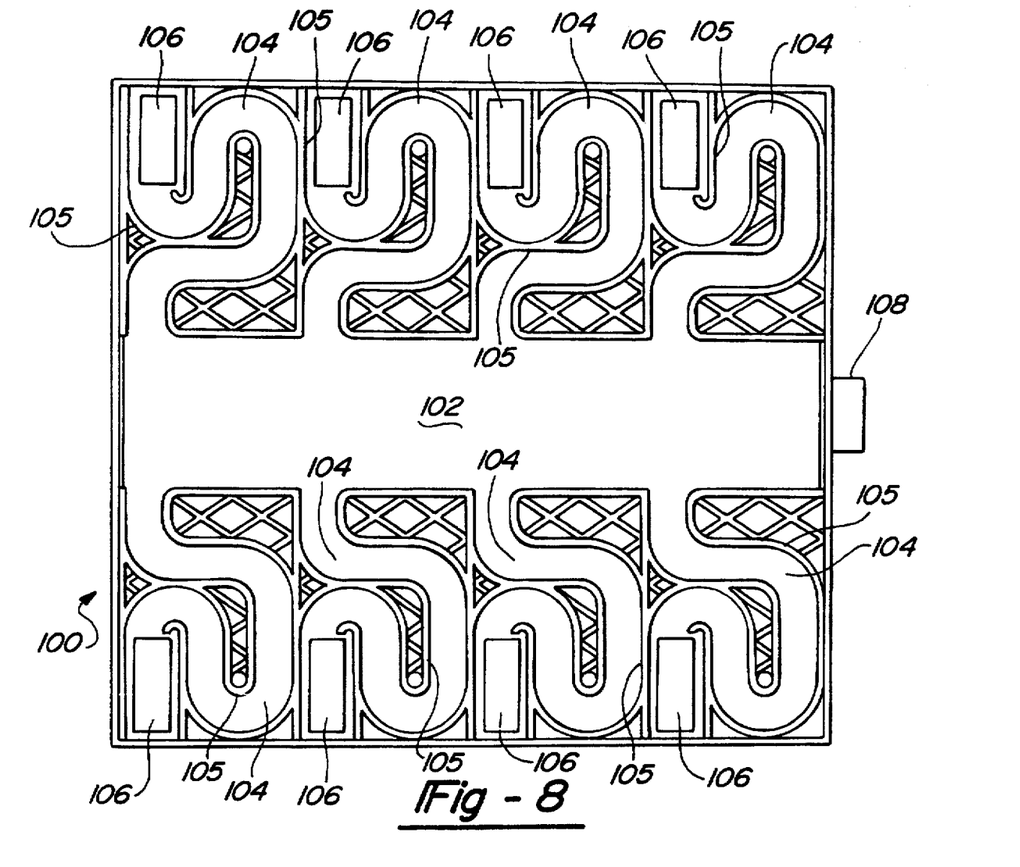
FIG. 8 is a plan view of a third embodiment of the labyrinth box member according to the principles of the present invention for use with a V-type engine.
Figure 9:
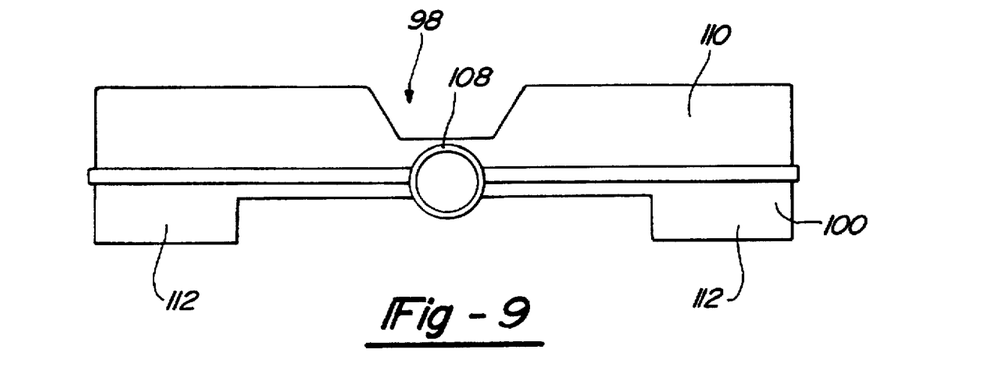
FIG. 9 is an end view of a labyrinth manifold for a use with a V-type engine.

The labyrinth manifold design according to the present invention can also be used with a V-type engine design. In particular, with reference to FIGS. 8 and 9, a labyrinth manifold 98 for use with a V-type engine would include labyrinth box member 100 and a cover member 110, shown in FIG. 9, for defining a centrally located plenum chamber 102 having serpentine or curved runners 104, defined by walls 105, disposed on each side thereof for communicating with outlet ports 106 which are connected with the valve ports of the cylinders on each bank of a V-type engine. A tubular flange 108 opens into plenum 102. An attachment flange 112 is provided for attaching the labyrinth manifold 98 to the intake ports of an engine. If preferred, the outlet ports could be located in the end wall of each of the runners.

In each of the labyrinth manifold designs discussed above, the length of each runner is tuned to a desired value in accordance with standard criteria based upon the engine parameters and desired performance characteristics. This value is usually calculated and specified to the manifold manufacturer by the engine designer. It should be understood that the present invention provides great flexibility for providing various lengths of runners without sacrificing the smaller packaging which is desired in automobile manufacturing. Furthermore, it is possible to easily incorporate other features such as valving, filters, and the like. It is also possible to mold-in a noise shield for noise reduction. The present invention may also be used for V-type engines.

The invention being thus described, it should be recognized by those skilled in the art that the same may be varied in many ways. Such variations are not to be regarded as a departure from the spirit and scope of the invention, and all such modifications are intended to be included within the scope of the following claims. For example, the runners of the labyrinth manifold have been defined as being labyrinth shaped, however, if short runners are needed for a specific application, the manifold design of the present invention can be used with straight runners while still obtaining the benefits of an easily moldable compact manifold assembly.

Figure 10:
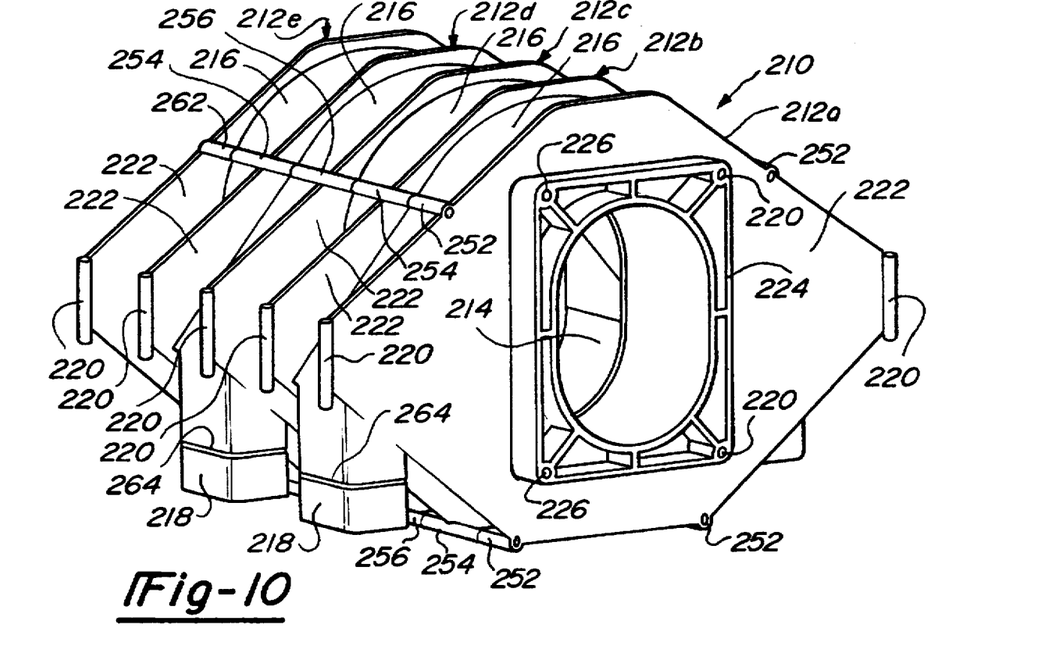
FIG. 10 is a perspective view of a stacked snail-type manifold according to a further embodiment of the present invention.

With reference to FIGS. 10–15, a further embodiment of the present invention will be described. As shown in FIG. 10, a stacked snail-type manifold 210 includes a plurality of manifold sections 212a–212e. The manifold sections 212a–212e are attached to one another in a stacked relationship in order to define a snail-type air intake manifold for use with an internal combustion engine. Manifold 210 includes a plenum portion 214 which communicates with a plurality of runners 216 each having an outlet port 218 for communicating with an engine intake port. A plurality of mounting bosses 220 are provided for mounting the stacked snail-type manifold 210 to an internal combustion engine.

Figure 11:
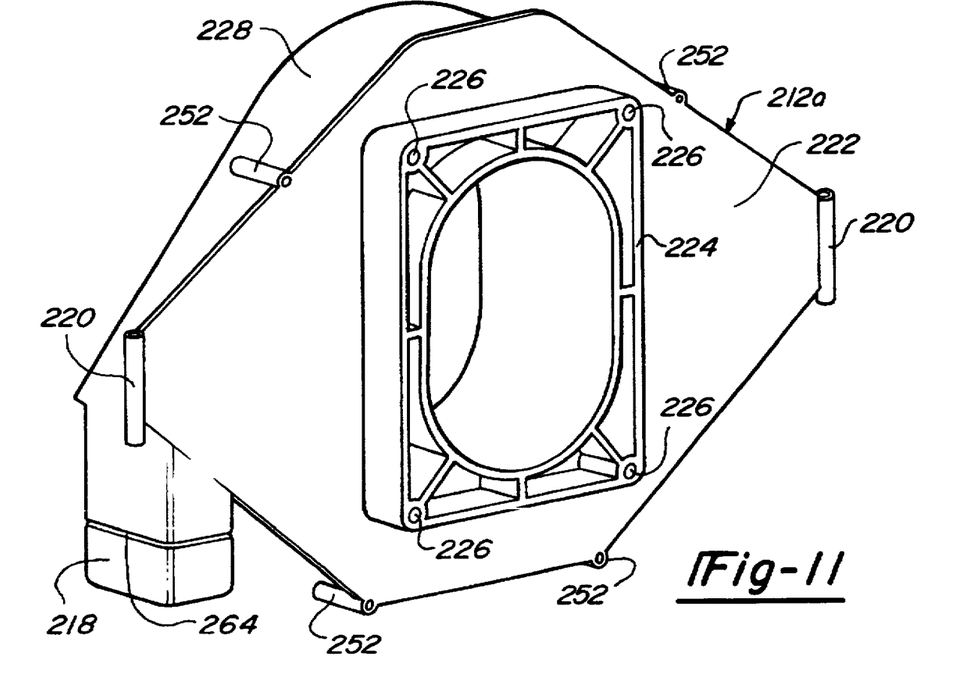
FIG. 11 is a perspective view of an end manifold section having a throttle body flange according to the principles of the present invention.

Manifold sections 212a–212e each include a generally flat plate 222 forming a base portion thereof. End manifold section 212a is provided with a mounting flange 224 on a first surface of plate 222. Mounting flange 224 is connected to the carburetor or throttle body of the air intake system (not shown). Mounting flange 224 can be integrally molded with end manifold section 212a or can be mounted thereto. Mounting flange 224 includes a plurality of bosses 226 for receiving mounting screws for attachment to a carburetor or throttle body. Bosses 226 can be designed to receive threaded metal or brass inserts (not shown). The inserts can be heat staked, ultrasonically staked, or press fit into bosses 226.

Figure 12:
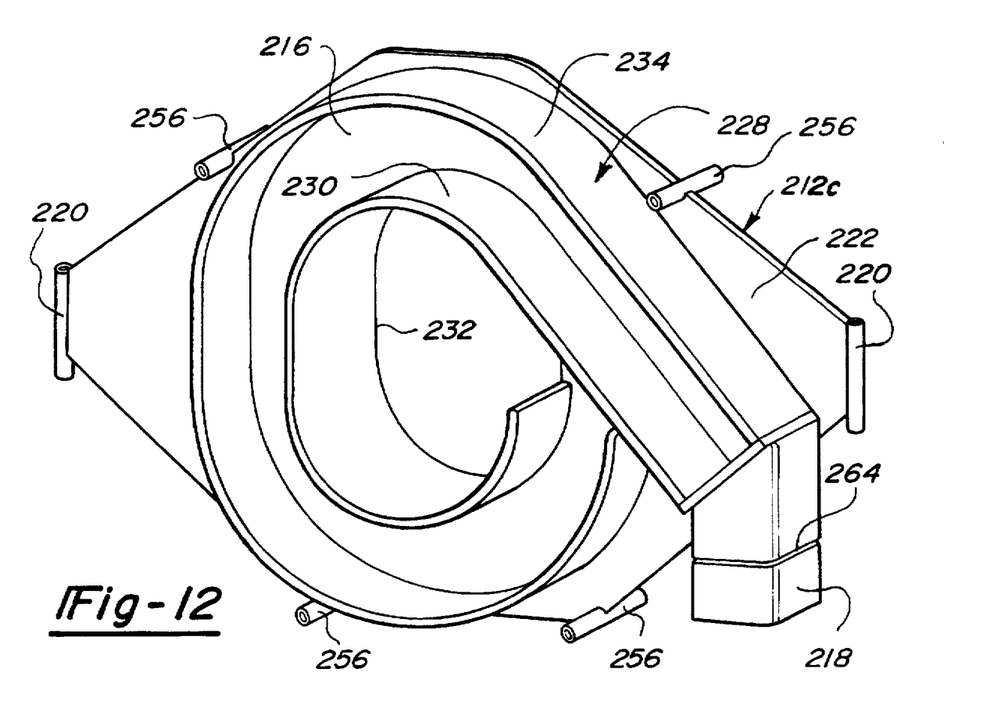
FIG. 12 is a perspective view of a manifold section illustrating an exemplary wall structure which defines the spiral-shaped runners according to the principles of the present invention.

Manifold sections 212a–212d each include a wall structure 228 which extends from a second side of plate 222 as best shown in FIG. 12. Wall structures 228 each include an inner wall 230 which partially surrounds an opening 232, provided in plate 222, and extends toward and connects with outlet ports 218. It is noted that for odd manifold sections 212a, 212c, outlet ports 218 end up on one cylinder head while outlet ports 218 of even numbered manifold sections 212b, 212d end up on the other cylinder head. An outer wall 234 is disposed a predetermined distance from inner wall 230 and defines a spiral-shaped runner 216 when the upper surfaces of inner and outer walls 230, 234 are engaged with corresponding grooves, such as grooves 238 shown in FIG. 14, which are disposed on a first surface of the flat plate 222 of manifold sections 212b–212e. Grooves 238 on the manifold sections 212b–212e mirror the shape of the inner and outer walls 230, 234 of the adjacent manifold sections.

Figure 13:
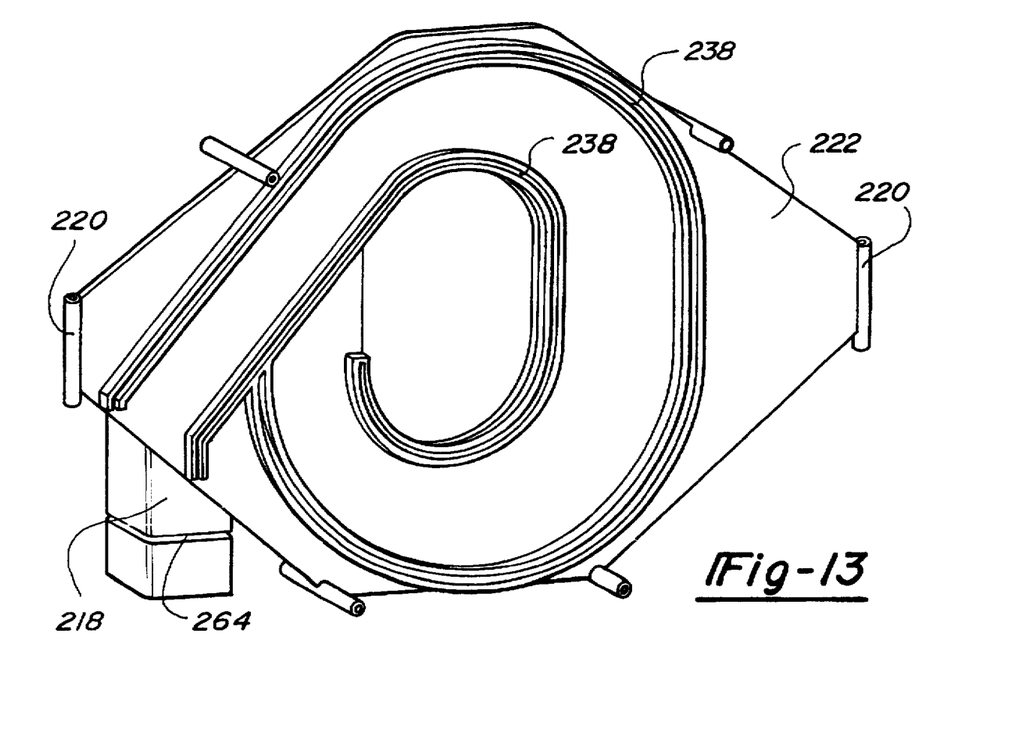
FIG. 13 is a perspective view of a manifold section showing exemplary grooves on the base portion of the manifold section for engaging with the wall structure of an adjacent manifold section according to the principles of the present invention.

The stacked snail-type manifold 210 shown in FIG. 10 is generally designed for a four cylinder V-type engine, although the addition of two or four manifold sections would easily convert the manifold for use with a six or eight cylinder V-type engine. It is also noted that the manifold sections can also be designed to have the outlet 218 of each section on the same side of the stacked snail-type manifold for use on an in-line type engine, as shown in FIG. 13. In particular, FIG. 13 illustrates a manifold section 250 which is utilized for an in-line engine with each of the outlet ports 218 being located on the same side of the manifold.

Figure 14:
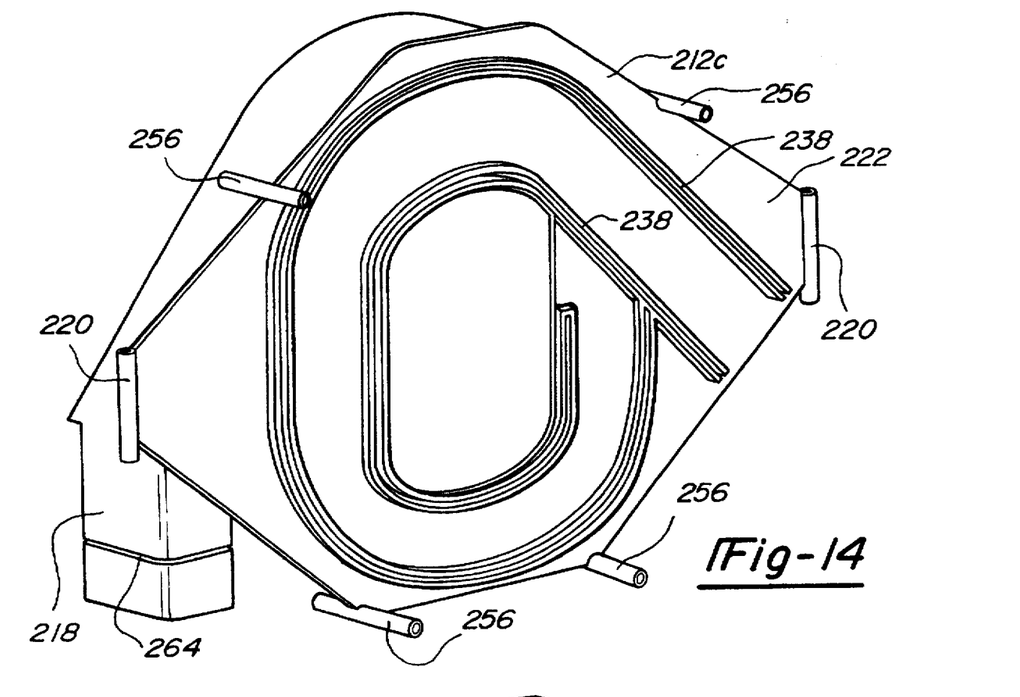
FIG. 14 is a perspective view of a manifold section for use with an in-line engine.

FIG. 10 illustrates each of the manifold sections necessary for constructing a stacked snail-type manifold 210 for use with a V-type engine. In particular, the design of end manifold section 212a is unique in that it includes a mounting flange 224 for mounting to the carburetor or throttle,and includes boss members 252 which extend rearward from plate 222 half the distance of the width of wall structure 228. Mounting bosses 252 of end manifold section 212a align with bosses 254 of manifold section 212b. Bosses 254 of manifold section 212b extend transversely from plate 222 a distance approximately equal to one-half the height of wall structure 228 of end manifold 212a and wall structure 228 of manifold section 212b. Manifold section 212b is designed to have the outlet 218 disposed on the opposite side of the manifold 210 relative to outlet 218 of manifold section 212a and manifold section 212c. Manifold section 212c has the same wall structure 228 as manifold section 212a but is provided with grooves 238 (as shown in FIG. 14) on the front face of plate 222 for mating with the corresponding wall structure 228 of manifold section 212b. Manifold section 212c is provided with mounting bosses 256 which align with mounting bosses 254 of manifold section 212b.

Figure 15:
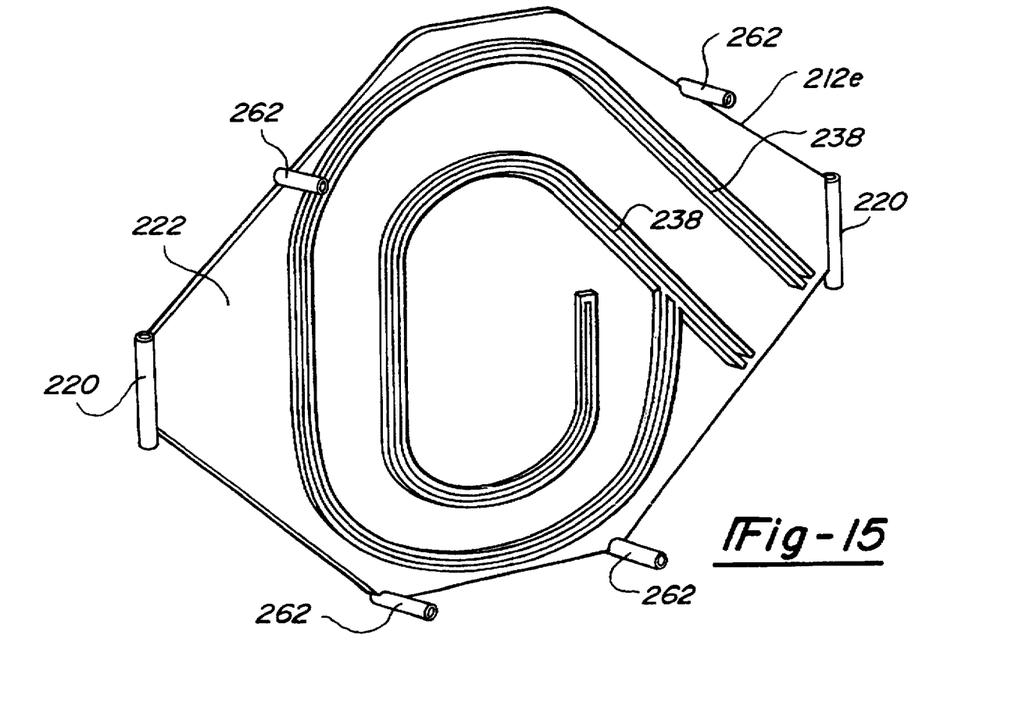
FIG. 15 is a perspective view of an end plate according to the principles of the present invention.

A manifold section 212d is identical to manifold section 212b including grooves 238 which mate with wall structure 228 of manifold section 212c and bosses 254 which align with bosses 256 of manifold section 212c. An end cap manifold section 212e is provided to seal the last of the runner-manifold sections 212d. As shown in FIG. 15, end cap manifold section 212e includes a generally flat plate 222 which includes grooves 238 which mate with wall structure 228 of manifold section 212d. A plurality of bosses 262 extend forward from plate 222 of manifold section 212e and align with bosses 254 of manifold section 212d.

In order to secure the manifold sections 212a–212e together, pins are inserted through bosses 252, 254, 256, 254, and 262. The pins (not shown) can be made from plastic such as nylon or from metal. Furthermore, an adhesive sealant may be used for sealing the wall structures of each manifold section in corresponding grooves of each manifold section. The adhesive sealant can be any known suitable adhesive sealant, such as room temperature vulcanizing (RTV) silicone sealant.

The manifold sections 212a–212e of stacked snail-type manifold 210 are preferably made from an engineering plastic material having suitable performance properties such as desirable heat stability and dimensional stability. By desirable heat stability, it is meant that the plastic material should be capable of withstanding the high temperatures that occur on the surface of the engine. By dimensional stability, it is meant that the material should not expand, contract, or warp under extreme high or low temperatures. Illustrative materials are nylon (polyamide), ABS polymer (acrylonitrile-butadiene-styrene), and polycarbonate. Such materials may also be reinforced with glass and/or mineral fibers or particles. Especially preferred materials are ULTRAMID® A3HG7 Blk Q17 20560 nylon, ULTRAMID® A3WG7 Blk 23210 nylon, and ULTRAMID® B3WG7 Blk 564 BGVW nylon, commercially from BASF Corporation of Wyandotte, Mich. The use of such materials provides a weight reduction in comparison with steel and aluminum manifolds which are currently in use. Furthermore, such materials require lower temperatures during processing than steel and aluminum. Thus, the manufacture of plastic manifolds is simpler and less expensive than steel or aluminum manifolds.

Although the advantages of using plastic manifolds are apparent, the manifold 210 may also be made from steel, aluminum or other suitable materials without sacrificing the smaller packaging and improved construction obtained by the design of the present invention. When a glass-reinforced nylon or other engineering plastic material is used, the manifold sections can be formed by known injection molding processes which are simpler and less expensive than steel and aluminum molding processes.

Outlet ports 218 are designed to be received into a pocket on the cylinder head and are provided with radial seals or O-rings disposed in recessed portion 264. The assembly to the engine entails dropping the outlet ends 218 into the pockets in the cylinder heads. Each runner end has a sealing system including an O-ring for providing an annular seal around the outlet 218. The manifold is fastened to the engine using vertical bolts through the outermost bosses 220. Alternatively, outlets 218 could be provided with a plurality of mounting bosses disposed along the edges thereof for mounting the manifold outlet port 218 to the upper surface of the cylinder head with individual fasteners for each runner.

The stacked snail-type manifold, according to the present invention, is much cheaper than the lost core manifold process. In addition, the method of the present invention is easily adaptable for use with V-4, V-6, V-8 and in-line engines. Furthermore, the simple design permits rapid changes as needed without expensive tooling overhauls.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manifold comprising:

a plurality of independent manifold sections including a base portion having a wall structure extending therefrom;

wherein said manifold sections are attached to one another in a stacked relationship such that said wall structure of said manifold sections mate, in a stacked relationship, with a base portion of an adjacent manifold section to define a plurality of manifold runners.

2. The manifold according to claim 1, wherein said base portion of said manifold sections include a generally flat plate having an opening through a central potion thereof.

3. The manifold according to claim 2, wherein said wall structure of said manifold sections include a first wall portion which extends along a substantial portion of said opening, said first wall portions defining a plenum which is connected to each of said runners.

4. The manifold according to claim 1, wherein said base portion of said manifold sections include a generally flat plate having grooves formed on a back side thereof for mating with said wall structure of an adjacent manifold section.

5. The manifold according to claim 1, wherein said wall structure includes an outlet port for mating with an intake valve port of an engine.

6. The manifold according to claim 5, wherein said outlet port is adapted to be partially inserted into the intake valve port of an engine.

7. The manifold according to claim 6, wherein said outlet port includes an annular seal around an outer surface thereof.

8. The manifold according to claim 1, further comprising an end manifold section including a throttle body mounting flange.

9. The manifold according to claim 3, further comprising an end manifold section including a generally flat plate for enclosing an end of said plenum.

10. The manifold according to claim 1, wherein said manifold sections include a plurality of bosses extending therefrom, said bosses being aligned with one another when said manifold sections are stacked together for receiving a fastening member therethrough.

11. The manifold according to claim 1, wherein said runners are spiral-shaped.

12. The manifold according to claim 1, wherein said manifold segments are made of plastic.

13. The manifold according to claim 1, wherein said wall structure is integrally formed as a unitary member with said base portion.

14. The manifold according to claim 12, wherein said manifold sections are made of glass reinforced nylon.

15. A manifold section for use in a stacked manifold assembly, comprising:

a base portion including a generally flat plate having a opening through a central portion thereof;

a wall structure extending from a first side of said generally flat plate; and a set of grooves on a second side of said generally flat plate for mating with a wall structure of another manifold section.

16. The manifold section according to claim 15, wherein said wall structure includes a pair of walls which define a spiral-shaped runner.

17. The manifold section according to claim 15, wherein said wall structure includes an outlet port for mating with an intake valve port of an engine.

18. The manifold section according to claim 15, wherein said manifold segment is made of plastic.

19. The manifold section according to claim 15, wherein said manifold segment is made of glass reinforced nylon.

20. The manifold section according to claim 18, wherein said wall structure is integrally formed as a unitary member with said base portion.

21. A method of making a manifold, comprising the steps of:

molding a plurality of manifold sections from a plastic material, said manifold sections including a base portion including a plate having an opening through a central portion thereof, a wall structure extending from a first side of said plate, and a set of grooves on a second side of said plate for mating with a wall structure of another manifold section;

stacking said manifold sections such that said wall structure of a plurality of said manifold sections engage said grooves of adjacent manifold sections.

* * * * *

UNITED STATES PATENT AND TRADEMARK OFFICE
CERTIFICATE OF CORRECTION

PATENT NO. : 5,704,325
DATED : January 6, 1998
INVENTOR(S) : Eric R. Sattler et al.

It is certified that error appears in the above-identified patent and that said Letters Patent is hereby corrected as shown below:

On the Title Page under Assignee, "Basf" should be --BASF--.

Column 7, line 57, before "212a" insert --section--.

Column 8, line 13, delete "254".

Column 8, line 17, before "corresponding" insert --the--.

Column 9, line 23, claim 2, "potion" should be --portion--.

Signed and Sealed this

Twenty-first Day of July, 1998

Attest:

BRUCE LEHMAN

*Attesting Officer*  *Commissioner of Patents and Trademarks*